Jan. 17, 1939.　　　　L. MURPHY　　　2,144,575
ELECTRIC MOTOR CONTROL
Filed Aug. 20, 1938
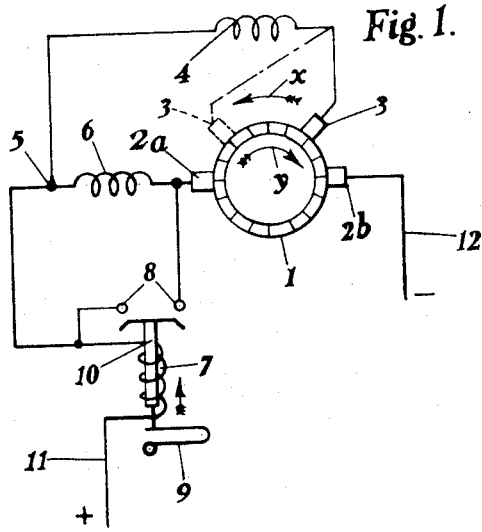
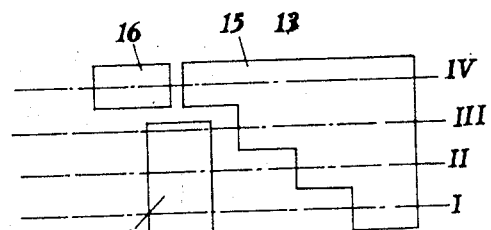
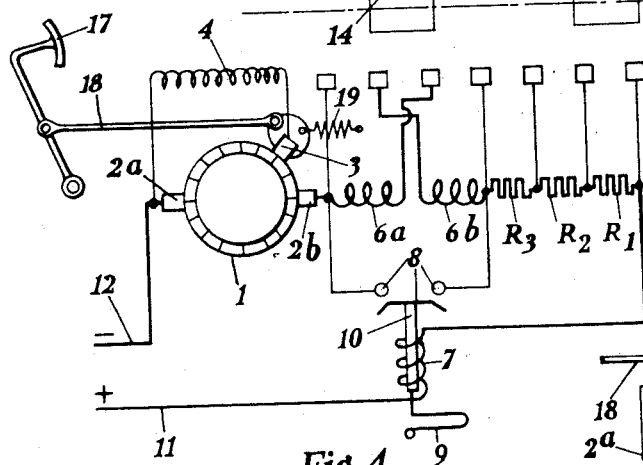
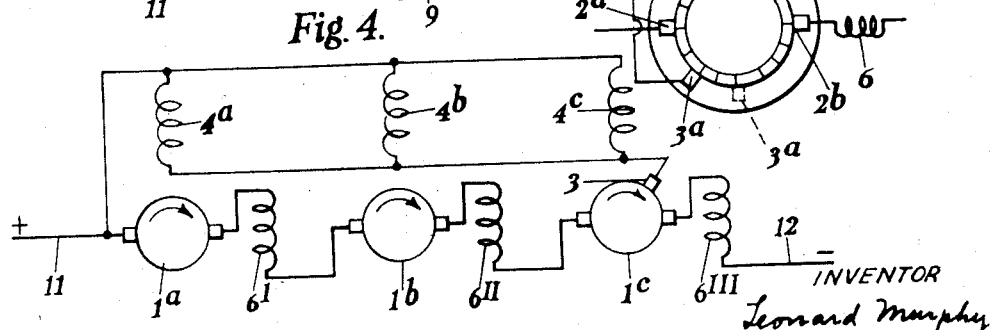
INVENTOR
Leonard Murphy
BY
Ralph B. Stewart
ATTORNEY Patented Jan. 17, 1939

2,144,575

UNITED STATES PATENT OFFICE 2,144,575

ELECTRIC MOTOR CONTROL

Leonard Murphy, Ganghill, Guildford, England

Application August 20, 1938, Serial No. 225,966
In Great Britain November 23, 1936

12 Claims. (Cl. 172—179)

This invention relates to the control of direct current dynamo electric machines and particularly of machines which operate under conditions of load such as involve the reversal of the direction of torque on the machine shaft, that is a change from motor to generator action with a given direction of rotation. The invention is particularly applicable to motor control systems for use on electrical vehicles, lifts, cranes and the like in which regenerative operation is essential or desirable.

In such cases in which large variations in load torque occur, it has hitherto been the general practice to use a series wound motor, sometimes in conjunction with variable series resistances, and sometimes with series-parallel control of the sections of the series field winding or of armature groupings or of both in order to obtain the required variations in speed. Upon reversal of torque which occurs under over-running conditions, such series motors without modification cannot be employed for regenerative braking so as to return energy to the source of supply.

On the other hand, if a shunt-excited motor be employed, limitation of the maximum torque which can be safely generated causes grave practical difficulty, while a very great variation in field strength must be provided for if regenerative conditions are to be established over any appreciable range of speed.

The main object of the present invention is to overcome these difficulties and to enable the speed of the motor to be varied independently of the load in a simple fashion and, at the same time to enable the input current to be limited and the motor to be protected from overload within certain limits.

Thus, according to the present invention, a dynamo electric machine with a shunt field winding is employed and the shunt winding derives its exciting potential from one line of the supply and from a brush which may be moved around the commutator of the machine into any selected position, while in addition, there is a series field winding in connection with which an automatically operating switch is provided which, within certain conditions of load, short-circuits the series field winding. Thus outside of the range of load within which the automatic switch short-circuits the series field winding, the switch is either fully open thus causing the series field to be inserted in the main circuit, or it may be progressively opened so as to insert sections or turns of the series winding in sequence. On reduction of load, these operations will be reversed, so that the machine may be operated either as a compound motor or generator or on the other hand purely as a shunt wound motor or generator or as a modified compound wound machine.

In such a control system, the ends of the shunt field winding may be caused to span any fraction of the arc subtended by the main brushes of the machine. It is preferred that the section of the commutator should be that which leads the main brush to which the shunt winding is connected with respect to the direction of rotation of the armature. Then owing to armature reaction, the shunt field winding will span that part of the commutator which corresponds to the part of the armature in which the magnetic field is crowded when the machine is working as a motor.

The series field may be connected in two or more sections and switching arrangements provided for starting and slow speed control in much the same way as with a plain series motor. The variation in the shunt field produced by shifting the movable brush may also be applied either to the field of a single motor or the fields of a number of motors or yet again a number of motors may all be provided with movable brushes and the variable voltage thus obtained may be applied as required to the shunt fields of any or all of them. The same considerations apply to individual motors having more than one commutator.

In order that the invention may be clearly understood and readily carried into effect, some examples in accordance therewith, will now be more fully described with reference to the accompanying drawing, in which:—

Figure 1 is an elementary diagram of connections of the control arrangements;

Figure 2 is a diagram showing the control circuit in somewhat greater detail;

Figure 3 is a diagram showing a modified form of the motor brush connections; and Figure 4 is a circuit diagram of a modified circuit arrangement.

Referring to Figures 1 and 2, I indicates the commutator of the motor on which the main brushes 2a, 2b rest. A movable pilot brush is shown at 3, the dotted position in Figure 1 indicating its adjustment for a weak shunt field. The arrow x indicates the direction of movement of the brush 3 and the arrow y the direction of rotation of the motor, so that the portion of the commutator between the brush 3 and the brush 2a which supplies the shunt field winding 4, corresponds to the magnetically crowded part of the armature when the machine is acting as a motor. The shunt winding 4 is shown connected in Figure 1 to the point 5 across the series field 6, but it may be connected direct to the main brush 2a as shown in Figure 2.

In the example shown the whole of the load or armature current is passed through the winding 7 of an electromagnetic switch, the contacts 8 of which when closed by the spring 9 short-circuit the series field winding 6. When the load current exceeds a certain value considered safe by pre-determination, the switch opens the contacts 8 by drawing down its plunger 10. When the load current falls below this value, the contacts 8 are closed again by the spring 9, so as automatically to short-circuit the series field winding 6, whereupon the machine operates purely as a shunt wound motor or generator.

Assuming now that the system illustrated in Figure 1 or Figure 2 is used for driving an electric vehicle from its battery which is connected across the conductors 11, 12, the control will consist mainly of two elements.

First a series control effected by a controller 13 in Figure 2, the drum of which is rotated by a hand lever or foot pedal (not shown) so as to bring the motor up from standstill to say 30 per cent of its normal speed, on the assumption that the shunt field winding 4 is meanwhile under full excitation owing to the pilot brush 3 being kept near the right-hand main brush 2b.

In Figure 2 the controller 13 is shown with four positions I, II, III and IV in addition to the "off" position, so that in succession resistance sections R1, R2, R3 are short-circuited in the positions I, II and III, during which time the two halves 6a, 6b of the series field winding 6 are connected in series by the controller segment 14; in the controller position IV the sections 6a, 6b are connected in parallel by the controller segments 15, 16.

Secondly, a control shown as an accelerator pedal 17, but which may be a thumb lever or other control, and is coupled by a link 18 to the pilot brush 3 is arranged when operated to weaken the shunt field 4 by moving the brush 3 towards the main brush 2a. The brush 3 is returned to its right-hand position by means of a spring 19 when the pedal 17 is released into its position of maximum excitation. The levers 17 and 18 and the spring 19 are shown diagrammatically for simplicity of illustration. In practice, a device such as a cable or stranded wire or a spring-loaded drum is preferred in order to provide for ample travel of the brush 3.

Obviously in addition or instead of the series parallel connections of the series field sections 6a, 6b, the series parallel connections of armature groupings may be employed for the low speed control.

In addition to the above described two main control elements, there is the automatic short-circuiting device consisting of the switch 7, 8, 9 and 10.

The mode of operation is, therefore, as follows:—The main control by the controller 13 is operated to supply current to the armature circuit while the brush 3 is at the minimum speed position. The armature current will possibly exceed the pre-determined safe maximum value for a shunt motor in which case the automatic short-circuiting device will open its contacts 8 so that the vehicle will accelerate to the minimum speed mentioned above with the strongest possible shunt field in addition to its series excitation.

As the effort required for acceleration becomes less, the contacts 8 will be closed by the spring 9 and the motor will commence to run as a true shunt motor on the strongest field. As more speed is required, the driver will now depress the accelerator pedal 17, with the result that the shunt field 4 will be weakened and the normal speed of the motor working as a shunt machine will increase. If again, the further acceleration effort causes an increase of current beyond the safe value, the contacts 8 will open during the acceleration period and bring in the series field 6 until such time as the higher speed has been reached and the current will, therefore, be again reduced to the pre-determined safe value. The process has been described in steps, but obviously becomes continuous up to the maximum speed of the vehicle and the contacts 8 will open under any circumstances, such as hill-climbing or acceleration where protection of the motor from excessive current is necessary.

When over-running takes place, such as when running down-hill, and with a chosen position of the movable brush 3, the vehicle will tend to drive the motor at such a speed that it generates a voltage in excess of that applied from the battery; current will be returned to the battery and regenerative braking will take place. If rapid braking is required, it is clear that release of the pedal 17 will give the maximum strength of shunt field and, therefore, maximum surplus of generated voltage over that of the supply battery and will, therefore, provide rapid deceleration. When travelling down a gradient of any known amount, the driver can obviously choose his speed by controlling the depression of the accelerator pedal to such an extent as will provide the braking torque requisite for that speed. Hence it is clear that regenerative braking by this method over a wide range of speeds can be secured at choice.

In Figure 3, two movable brushes 3a, 3b are provided mounted on a rotatable carrier ring or plate 19 so that they may be moved together by the link 18 around the commutator. The shunt field winding 4 is connected between the movable brushes 3a, 3b but otherwise, the connections are as in Figures 1 and 2. In the dotted positions of the brushes 3a, and 3b, the shunt field has been brought to zero excitation.

As already mentioned, the variations in the shunt field produced by shifting the movable brush 3 or the brushes 3a, 3b, may be applied to the fields of a number of motors, and this is illustrated in Figure 4, where there are three series motors indicated by their commutators 1a, 1b, 1c, and by their series field windings 6', 6'' and 6''', all of which are connected in series between the supply conductors 11, 12. The movable brush 3 is only provided at the commutator 1c, but it varies the shunt fields 4a, 4b, 4c, which are connected in parallel simultaneously and to the same extent. Yet again a number of motors may all be provided with movable brushes 3 and the variable voltage thus obtained may be applied as required to the shunt fields of any or all of them. Furthermore, the commutators 1a, 1b and 1c in Figure 4 may be equally regarded as separate commutators of one individual motor.

The protective device 7, 8, 9 and 10 for opening the short-circuit on the series field may be either of a polarized or non-polarized character so as to give protection both during motoring and regeneration or under one of these conditions only.

In order to prevent hunting such as would occur with the simple arrangement of the switch 7, 8, 9 and 10 as described, the magnetic circuit of that switch may conveniently be arranged to have a considerable hysteresis lag so that the current required to open the contacts 8 is substantially greater than that which will permit the spring 9 to restore them. An oil or air dashpot or an eddy current damper may also be provided to damp the mechanical movement. Such devices are well understood and are not essential to the invention.

It will be observed that if this device cuts in the series field due to an excessive rate of regeneration, it will have the effect of weakening the total field strength as in this case, the series and shunt elements will be magnetically in opposition. It will therefore unload the motor and compel the operator to use other means such as friction brakes to retard the motion of the vehicle.

In the examples described above, it is assumed that regeneration will be required for braking purposes only. It will, however, be seen that a dynamo-electric machine in combination with a control of the form described may be used to load or assist a power producing unit of any kind (such as a combination of petrol engine and the dynamo electric machine described), in such a way that the power unit has only to produce the average power requirement while any greater or less condition or an over-running condition, will be met by the dynamo-electric machine motoring or generating and thus the power producing unit is loaded or assisted to such an extent as will give the desired instantaneous total output.

I claim:

1. In an electric motor control system, the combination of an electric motor comprising an armature, a commutator, a brush mounted for movement around said commutator, a field winding connected in series with said armature and a shunt field winding connected to said brush, with an electrically operable switch connected to operate in accordance with the armature current and having contacts for controlling said series-connnected field winding so as to reduce the effective number of turns of said series connected winding within predetermined values of the armature current.

2. In an electric motor control system, the combination of an electric motor comprising an armature, a commutator, a brush mounted for movement around said commutator, a field winding connected in series with said armature and a shunt field winding connected to said brush, with an electro-magnetic switch having its winding connected to receive a current proportional to the armature current and its contacts connected to said series-connected field winding so as to reduce the effective number of turns of said series-connected winding within predetermined values of the armature current.

3. In an electric motor control system, the combination of an electric motor comprising an armature, a commutator, main brushes on said commutator, a brush mounted for movement around said commutator, a field winding connected in series with said armature and a shunt field winding connected between said movably-mounted brush and one of said main brushes, with an electrically operable switch connected to operate in accordance with the armature current and having contacts for controlling said series-connected field winding so as to reduce the effective number of turns of said series connected winding within predetermined values of the armature current.

4. In an electric motor control system, the combination of an electric motor comprising an armature, a commutator, a brush mounted for movement around said commutator, a field winding connected in series with said armature and a shunt field winding connected to said brush, with an electrically operable switch connected to operate in accordance with the armature current and having contacts for controlling said series-connected field winding so as to short-circuit said series-connected winding within predetermined values of the armature current.

5. In an electric motor control system, the combination of an electric motor comprising an armature, a commutator, a brush mounted for movement around said commutator, a field winding connected in series with said armature and a shunt field winding connected to said brush, with an electro-magnetic switch having its winding connected to receive a current proportional to the armature current and its contacts connected to said series-connected field winding so as to short-circuit said series-connected winding within predetermined values of the armature current.

6. In an electric motor control system, the combination of an electric motor comprising an armature, a commutator, main brushes on said commutator, a brush mounted for movement around said commutator, a field winding connected in series with said armature and a shunt field winding connected between said movably mounted brush and a main brush trailing said movably-mounted brush with respect to the direction of rotation of said armature, with an electrically operable switch connected to operate in accordance with the armature current and having contacts for controlling said series-connected field winding so as to reduce the effective number of turns of said series connected winding within predetermined values of the armature current.

7. In an electric motor control system, the combination of an electric motor comprising an armature, a commutator, a pair of brushes mounted to move together around said commutator and spaced one hundred and eighty electrical degrees apart, a field winding connected in series with said armature and a shunt field winding connected between said movably mounted brushes, with an electrically operable switch connected to operate in accordance with the armature current and having contacts for controlling said series-connected field winding so as to reduce the effective number of turns of said series-connected winding within predetermined values of the armature current.

8. In an electric motor control system, the combination of an electric motor comprising an armature, a commutator, a brush mounted for movement around said commutator, a field winding connected in series with said armature and a shunt field winding connected to said brush, with an electromagnetic switch having its winding connected in series with said armature and its contacts connected to said series-connected field winding so as to short-circuit said series-connected winding within predetermined values of the armature current.

9. In an electric motor control system, the combination of an electric motor comprising an armature, a commutator, a brush mounted for movement around said commutator, a field winding connected in series with said armature and a shunt field winding connected to said brush, with an electrically operable switch connected to operate in accordance with the armature current and having contacts for controlling said series-connected field winding so as to reduce the effective number of turns of said series connected winding within predetermined values of the armature current, said shunt field winding being designed so that in certain positions of said brush, the motor is over-excited and is enabled to operate as a generator.

10. In a control system for an electric vehicle motor, the combination of an electric motor comprising an armature, a commutator, a brush mounted for movement around said commutator, a series field winding disposed in a plurality of separate sections and a shunt field winding connected to said brush, with an electrically operable switch connected to operate in accordance with the armature current and having contacts for controlling said series field winding so as to reduce the effective number of turns of said series connected winding within predetermined values of the armature current, a control switching means connected to said series field winding for starting said motor and controlling same up to a predetermined speed by means of series-parallel connection of said sections of said series field winding, and means for shifting said movably-mounted brush for varying the potential applied to said shunt field winding and controlling said motor at speeds above said predetermined speed.

11. In an electric motor control system, the combination of an electric motor comprising an armature, a commutator, a brush mounted for movement around said commutator, a field winding connected in series with said armature and a shunt field winding connected to said brush, an electrically operable switch connected to be energized in accordance with the armature current and having contacts normally short-circuiting said series field winding, said electrically operated switch being operable upon a predetermined armature current to remove the short-circuit from said series field winding.

12. In an electric motor control system, the combination of an electric motor comprising an armature, a commutator, main brushes on said commutator, a brush mounted for movement around said commutator, a field winding connected in series with said armature and a shunt field winding connected between said movably mounted brush and one of said main brushes, means for normally short-circuiting said series field winding, and means responsive to the armature current for removing said short-circuit upon a predetermined value of armature current.

LEONARD MURPHY.